(12) United States Patent
Ryu et al.

(10) Patent No.: US 10,848,672 B2
(45) Date of Patent: Nov. 24, 2020

(54) IMAGE STABILIZING METHOD AND APPARATUS

(71) Applicant: Hanwha Techwin Co., Ltd., Changwon-si (KR)

(72) Inventors: Yeongeol Ryu, Changwon-si (KR); Sangji Park, Changwon-si (KR); Hwalsuk Lee, Changwon-si (KR); Shimin Yin, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 85 days.

(21) Appl. No.: 16/133,196

(22) Filed: Sep. 17, 2018

(65) Prior Publication Data

US 2019/0020821 A1    Jan. 17, 2019

Related U.S. Application Data

(63) Continuation of application No. 15/288,788, filed on Oct. 7, 2016, which is a continuation-in-part of (Continued)

(30) Foreign Application Priority Data

Jul. 12, 2013 (KR) .................. 10-2013-0082470
Jan. 21, 2014 (KR) .................. 10-2014-0007467
Mar. 23, 2015 (KR) .................. 10-2015-0040206

(51) Int. Cl.
*H04N 5/232* (2006.01)
*G06K 9/62* (2006.01)
(Continued)

(52) U.S. Cl.
CPC ......... *H04N 5/23267* (2013.01); *G06K 9/481* (2013.01); *G06K 9/6211* (2013.01);
(Continued)

(58) Field of Classification Search
CPC .................. G06T 7/246; G06T 2207/20182
See application file for complete search history.

(56) References Cited

U.S. PATENT DOCUMENTS 5,107,293 A    4/1992  Sekine et al.
5,748,231 A    5/1998  Park et al.
(Continued)

FOREIGN PATENT DOCUMENTS

JP    2941815 B2    8/1999
JP    2011-3057 A   1/2011
(Continued)

OTHER PUBLICATIONS

Office Action dated Feb. 15, 2019 by the Korean Intellectual Property Office in counterpart Korean Patent Application No. 10-2014-0007467.

*Primary Examiner* — William C Vaughn, Jr.
*Assistant Examiner* — Jerry T Jean Baptiste
(74) *Attorney, Agent, or Firm* — Sughrue Mion, PLLC

(57) ABSTRACT

Provided are an image stabilizing apparatus and method thereof. The image stabilizing apparatus performs image stabilization by using both an image sensor and a motion sensor. Image distortion and movement are stably corrected by using both the position of a feature point, which is extracted by the image sensor and image processing, and the movement position of the feature point, which is predicted by the motion sensor.

20 Claims, 8 Drawing Sheets

Related U.S. Application Data application No. 14/830,894, filed on Aug. 20, 2015, now Pat. No. 9,578,241, which is a continuation-in-part of application No. 14/601,467, filed on Jan. 21, 2015, now Pat. No. 9,466,095, which is a continuation-in-part of application No. 14/075,768, filed on Nov. 8, 2013, now Pat. No. 9,716,832.

(51) Int. Cl.

| | | |
|---|---|---|
| *G06K 9/48* | (2006.01) | |
| *G06T 5/00* | (2006.01) | |
| *G06T 5/50* | (2006.01) | |
| *G06T 7/246* | (2017.01) | |

(52) U.S. Cl.
CPC .............. *G06T 5/002* (2013.01); *G06T 5/50* (2013.01); *G06T 7/246* (2017.01); *H04N 5/23254* (2013.01); *H04N 5/23258* (2013.01); *G06T 2207/10016* (2013.01); *G06T 2207/20182* (2013.01)

(56) References Cited

U.S. PATENT DOCUMENTS

| | | | |
|---|---|---|---|
| 6,625,214 | B1 | 9/2003 | Umehara et al. |
| 7,010,045 | B2 | 3/2006 | Lee |
| 7,956,898 | B2 | 6/2011 | Chen et al. |
| 8,116,576 | B2 | 2/2012 | Kondo |
| 8,139,885 | B2 | 3/2012 | Hsu |
| 8,325,810 | B2 | 12/2012 | Vella et al. |
| 8,340,185 | B2 | 12/2012 | Biswas et al. |
| 8,416,307 | B2 | 4/2013 | McLeod |
| 8,737,687 | B2 | 5/2014 | Jelinek |
| 8,773,542 | B2 | 7/2014 | Jiang et al. |
| 8,787,656 | B2 | 7/2014 | Park et al. |
| 8,797,414 | B2 | 8/2014 | Park et al. |
| 8,988,536 | B2 | 3/2015 | Park et al. |
| 9,055,223 | B2 | 6/2015 | Slutsky et al. |
| 9,100,575 | B2 | 8/2015 | Lee et al. |
| 9,232,140 | B2 | 1/2016 | Saitwal et al. |
| 2006/0177209 | A1 | 8/2006 | Miyasako |
| 2007/0140528 | A1 | 6/2007 | Anai et al. |
| 2008/0107307 | A1* | 5/2008 | Altherr .............. H04N 5/23248 382/107 |
| 2008/0152332 | A1* | 6/2008 | Koo ................... H04N 5/23248 396/55 |
| 2010/0014709 | A1 | 1/2010 | Wheeler et al. |
| 2010/0053343 | A1 | 3/2010 | Kim et al. |
| 2010/0074531 | A1* | 3/2010 | Tanaka ................. G06K 9/3216 382/201 |
| 2010/0134640 | A1 | 6/2010 | Kuo et al. |
| 2011/0105181 | A1 | 5/2011 | McLeod |
| 2011/0150284 | A1* | 6/2011 | Son ......................... G06T 7/215 382/103 |
| 2012/0014565 | A1 | 1/2012 | Akiyama et al. |
| 2012/0120264 | A1 | 5/2012 | Lee et al. |
| 2012/0242847 | A1 | 9/2012 | Narita |
| 2013/0107066 | A1* | 5/2013 | Venkatraman ..... H04N 5/23254 348/208.4 |
| 2013/0121537 | A1* | 5/2013 | Monobe ................... G02B 7/38 382/106 |
| 2013/0129144 | A1 | 5/2013 | Chang et al. |
| 2013/0170698 | A1 | 7/2013 | Jelinek |
| 2013/0265460 | A1* | 10/2013 | Wu ......................... G06T 5/006 348/222.1 |
| 2013/0307937 | A1 | 11/2013 | Kim |
| 2014/0204228 | A1 | 7/2014 | Yokokawa et al. |
| 2014/0247370 | A1 | 9/2014 | Lee et al. |

FOREIGN PATENT DOCUMENTS

| | | |
|---|---|---|
| JP | 5008421 B2 | 8/2012 |
| KR | 1997-0004927 B1 | 4/1997 |
| KR | 10-2004-0083822 A | 10/2004 |
| KR | 100498042 B1 | 7/2005 |
| KR | 10-2009-0034836 A | 4/2009 |
| KR | 100968974 B1 | 7/2010 |
| KR | 10-2012-0105764 A | 9/2012 |
| KR | 10-1202642 B1 | 11/2012 |
| KR | 10-2013-0057283 A | 5/2013 |
| KR | 101288945 B1 | 7/2013 |

\* cited by examiner

IMAGE STABILIZING METHOD AND APPARATUS

CROSS-REFERENCE TO THE RELATED APPLICATION

This is a continuation of U.S. application Ser. No. 15/288,788 filed Oct. 7, 2016, which is a continuation-in-part (CIP) application of U.S. application Ser. No. 14/830,894 filed Aug. 20, 2015, U.S. application Ser. No. 14/601,467 filed Jan. 21, 2015 and published as US 2015/0206290 A1 on Jul. 23, 2015, and U.S. application Ser. No. 14/075,768 filed Nov. 8, 2013 and published as US 2015/0015727 A1 on Jan. 15, 2015, and which claims priority from Korean Patent Application No. 10-2015-0040206 filed on Mar. 23, 2015, Korean Patent Application No. 10-2014-0007467 filed on Jan. 21, 2014, and Korean Patent Application No. 10-2013-0082470 filed on Jul. 12, 2013, respectively, in the Korean Intellectual Property Office, the entire disclosures of which are incorporated herein in their entirety by reference.

BACKGROUND

1. Field

Apparatuses and methods consistent with exemplary embodiments relate to stabilizing images captured by one or more cameras by using a sensor fusion scheme.

2. Description of the Related Art

In general, an image stabilization scheme, which corrects image trembling occurring from various causes, uses a method of matching or tracking corresponding points in two images.

However, this image stabilization scheme is very susceptible to an external impact, image quality degradation, or the like. Also, when a moving object exists in a captured image, image correction may not be properly performed with respect to the moving object.

Particularly, in the case of a method of correcting a motion based on image processing, when a motion deviating from a tracking region or a tracking window size occurs, the motion may be difficult to correct.

SUMMARY

Exemplary embodiments of the inventive concept provide apparatuses and methods of outputting stable images without image movement such as vibration by using a sensor fusion scheme even in the cases of the degradation of image quality, the occurrence of external impact on an image capturing apparatus, and the existence of a moving object in a captured image.

Various aspects of the inventive concept will be set forth in part in the description which follows and, in part, will be apparent from the description, or may be learned by practice of the presented embodiments.

According to one or more exemplary embodiments, there is provided an image stabilizing apparatus which may include: a feature point extractor configured to extract a feature point in a first input image captured by an image capturing apparatus; a movement amount detector configured to detect a movement amount of the image capturing apparatus in response to movement of the image capturing apparatus; a movement position predictor configured to predict a movement position, to which the extracted feature point is expected to have moved by the movement of the image capturing apparatus, in a second input image capture by the image capturing apparatus; a corresponding position detector configured to determine a position of a corresponding feature point in the second input image corresponding to the extracted feature point in the first input image after the movement of the image capturing apparatus; a comparator configured to compare the predicted movement position and the position of the corresponding feature point; and an image stabilizer configured to correct image distortion in the second input image caused by the movement of the image capturing apparatus, based on a result of the comparison.

The comparator may determine that the position of the corresponding feature point is accurate if a distance between the predicted movement position and the position of the corresponding feature point is within a predetermined range, and the image stabilizer may correct the image distortion based on the position of the corresponding feature point if the distance is within the predetermined range. However, the distance is out of the predetermined range, and then, the position of the corresponding feature point is not used as valid data for correction of the image distortion.

According to one or more exemplary embodiments, there is provided a method of performing image stabilization in an image capturing apparatus. The method may include: extracting, by a feature point extractor, a feature point in a first input image captured by an image capturing apparatus; detecting, by a movement amount detector, a physical movement amount of the image capturing apparatus in response to movement of the image capturing apparatus; predicting, by the movement position predictor, a movement position, to which the extracted feature point is expected to have moved by the movement of the image capturing apparatus, in a second input image capture by the image capturing apparatus; determining, by a corresponding position detector, a position of a corresponding feature point in the second input image corresponding to the extracted feature point in the first input image after the movement of the image capturing apparatus; comparing, by a comparator, the predicted movement position with the position of the corresponding feature point; and correcting, by an image stabilizer, image distortion in the second input image caused by the movement of the image capturing apparatus, based on a result of the comparison.

The method may further include determining that the position of the corresponding feature point is accurate if a distance between the predicted movement position and the position of the corresponding feature point is within a predetermined range, and correcting the image distortion may be performed based on the position of the corresponding feature point if the distance is within the predetermined range. However, the distance is out of the predetermined range, and then, the position of the corresponding feature point is not used as valid data for correction of the image distortion.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
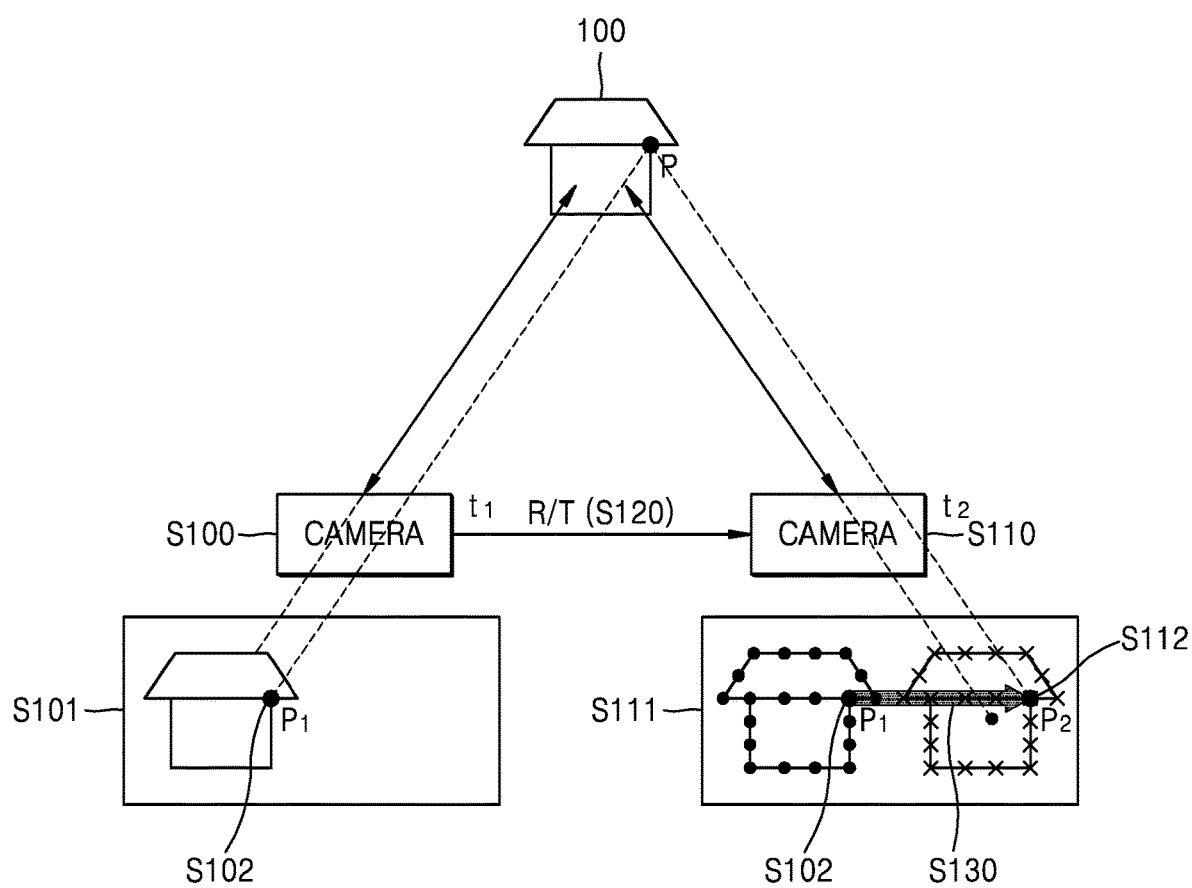
FIG. 1 illustrates a diagram to explain the occurrence of movement of an image capturing apparatus, according to an exemplary embodiment.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the drawings, to explain various aspects of the inventive concept. As used herein, the term "and/or" includes any and all combinations of one or more of the associated listed items.

FIG. 1 illustrates a diagram to explain the occurrence of movement of an image capturing apparatus according to an exemplary embodiment.

Referring to FIG. 1, when the image capturing apparatus moves or is moved by an external impact or the like, a rotation or translation (R/T) movement S120 thereof may occur. FIG. 1 illustrates a case in which the image capturing apparatus is moved from an initial position S100 at a time $t_1$ to a position S110 at a time $t_2$ intentionally or unintentionally with respect to an object 100.

When the image capturing apparatus is moved as shown in FIG. 1, a distortion may occur between an image captured at the time $t_1$ before the occurrence of the movement of the image capturing apparatus and an image captured at the time $t_2$ after the occurrence of the movement of the image capturing apparatus. As an example, a feature point P of the object 100 may be detected at a $P_1$ point S102 in an input image S101 of the camera at the time $t_1$ before the occurrence of the movement of the image capturing apparatus. However, the feature point P of the object 100 may be detected at a $P_2$ point S112 in an input image S111 of the camera at the time $t_2$ after the occurrence of the movement of the image capturing apparatus.

According to an exemplary embodiment, an image stabilizing apparatus may stabilize an image by using a sensor fusion scheme. The image stabilizing apparatus may stabilize an image by removing distortion caused by various movement of the image capturing apparatus such as wobbling or vibration thereof by using both an image sensor and a motion sensor. The image stabilizing apparatus may be implemented in the image capturing apparatus such as robot, vehicle, military equipment, camera, mobile phone, smart phone, laptop computer, tablet, handheld apparatus, not being limited thereto. According to an exemplary embodiment, the image capturing apparatus may capture an image by using an image sensor such as a complementary metal-oxide-semiconductor (CMOS) image sensor not being limited thereto.

Figure 3:
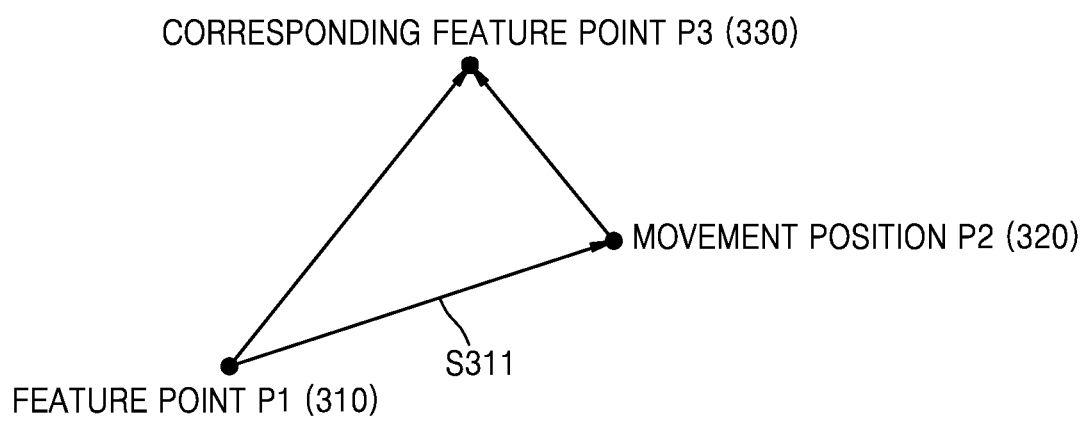
FIG. 3 illustrates a main concept of performing image stabilization in an image stabilizing apparatus by using both an image sensor and a motion sensor, according to an exemplary embodiment.

A camera will be described below as an example of the image stabilizing apparatus. FIG. 3 illustrates a main concept of performing image stabilization in an image stabilizing apparatus by using both an image sensor and a motion sensor.

Referring to FIG. 3, a camera detects a feature point $P_1$ 310 in a previous image that is captured before the camera is moved.

Also, the camera detects a physical movement amount of the camera by using a motion sensor when the camera moves by wind, external impact, or a hand shake of a user. Here, the physical movement may indicate intentional or unintentional tilting, panning, rotation, and/or any other movement of the camera. Next, the camera predicts a movement position $P_2$ 320, to which the feature point $P_1$ 310 is expected to have moved or would have moved in a current image that is captured after the occurrence of the movement, on the basis of the detected physical movement amount.

Thereafter, the camera detects a corresponding feature point $P_3$ 330, which corresponds to the feature point $P_1$ 310 detected in the previous image, in the current image captured by the camera after the occurrence of the movement. The camera may detect the corresponding feature point $P_3$ 330 from the movement position $P_2$ 320 by using feature point tracking. In this case, a calculation amount and a calculation time to obtain the corresponding feature point $P_3$ 330 may be reduced compared to the case in which the corresponding feature point $P_3$ 330 is detected from the feature point $P_1$ 310.

When a distance between the predicted movement position $P_2$ 320 and the position of the corresponding feature point $P_3$ 330 is within a predetermined range, the camera determines that the position of the corresponding feature point $P_3$ 330 is accurate, and uses the same as valid data for distortion correction.

However, when the distance between the predicted movement position $P_2$ 320 and the position of the corresponding feature point $P_3$ 330 is out of the predetermined range, the camera determines that the position of the corresponding feature point $P_3$ 330 is inaccurate or that the corresponding feature point $P_3$ 330 is a feature point of a moving object, and does not use data of the corresponding feature point $P_3$ 330.

Figure 2:
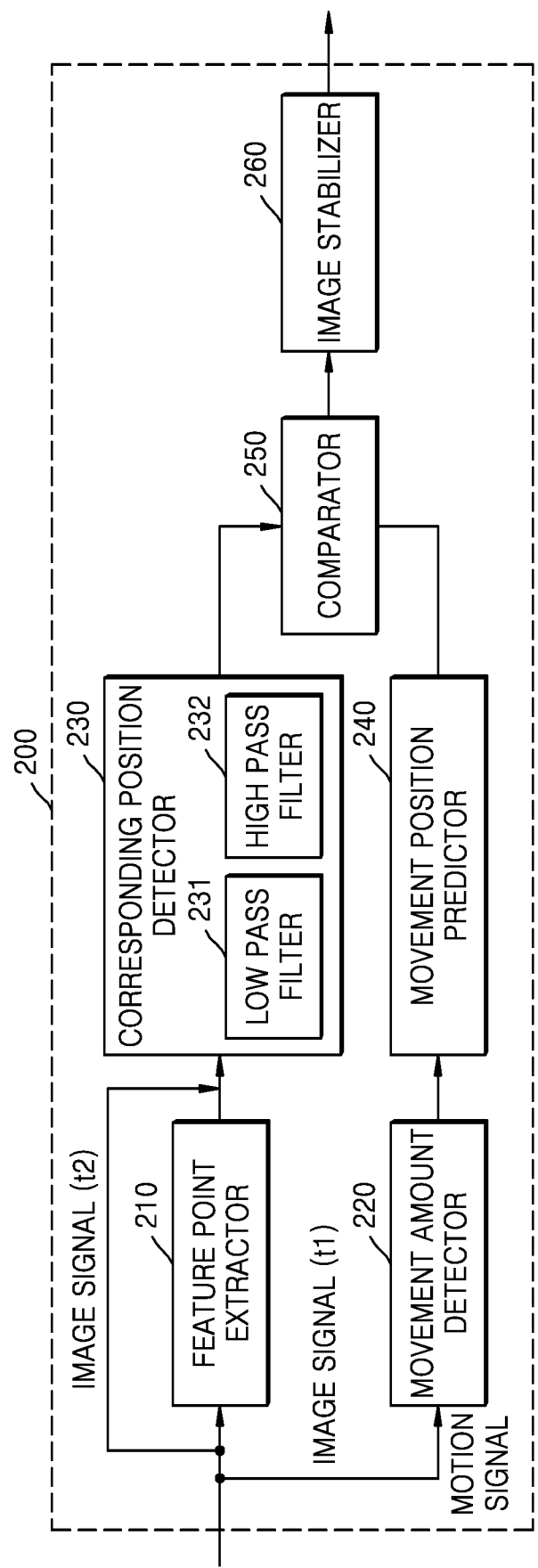
FIG. 2 illustrates an internal configuration of an image stabilizing apparatus, according to an exemplary embodiment.

FIG. 2 illustrates an internal configuration of an image stabilizing apparatus 200 according to an exemplary embodiment.

Referring to FIG. 2, the image stabilizing apparatus 200 may include a feature point extractor 210, a movement amount detector 220, a corresponding position detector 230, a movement position predictor 240, a comparator 250, and an image stabilizer 260.

The feature point extractor 210 extracts a feature point from an image signal input to an image capturing apparatus. According to an exemplary embodiment, a feature point may be extracted in an input image by using a general feature point extraction scheme.

Figure 4:
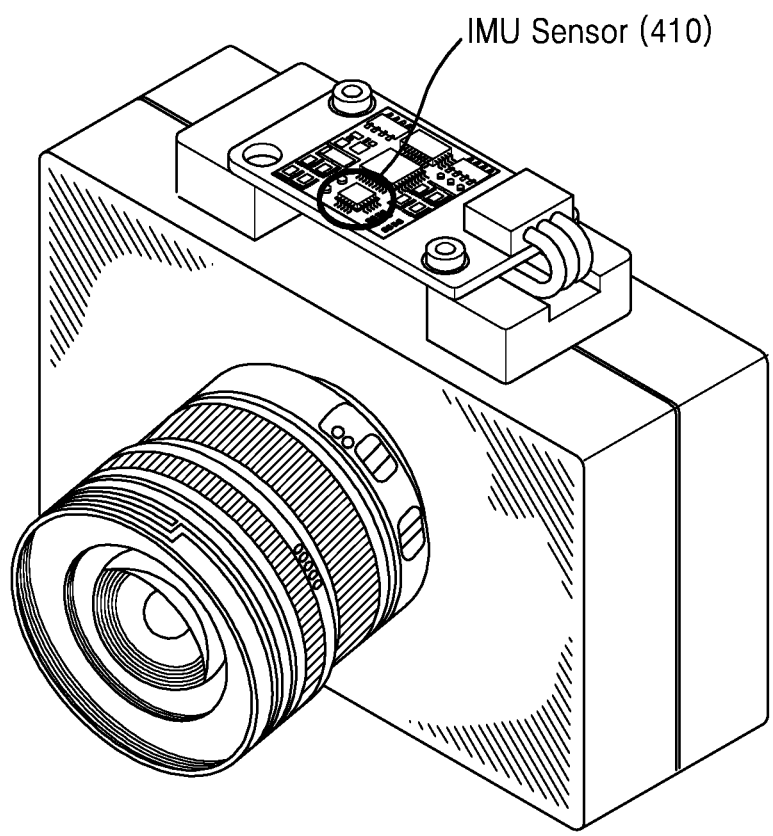
FIG. 4 illustrates an example of a motion sensor used in an image stabilizing apparatus.

The movement amount detector 220 detects a physical movement amount of the image capturing apparatus by using a motion sensor installed in the image capturing apparatus when the image capturing apparatus moves intentionally or unintentionally. The motion sensor may be, for example, a gyro sensor. The gyro sensor may be a three-dimensional (3D) gyro sensor. Also, as illustrated in FIG. 4, an inertial measurement unit (IMU) sensor 410 (see FIG. 4) may be used to measure a movement amount, motion, or the like.

The movement position predictor 240 determines a local motion vector S311 (see FIG. 3) by using the physical movement amount detected by the movement amount detector 220. Also, the movement position predictor 240 predicts a movement position $P_2$ 320 (see FIG. 3), to which the feature point $P_1$ 310 (see FIG. 3) is expected to have moved by the movement of the image capturing apparatus, by using the determined local motion vector S311.

The corresponding position detector 230 determines a position of a corresponding feature point $P_3$ 330 (see FIG. 3) corresponding to the feature point $P_1$ 310 (see FIG. 3) extracted in the input image by using an input image captured by the image capturing apparatus after the image capturing apparatus moves.

In this case, the corresponding position detector 230 calculates a global motion vector S130 (see FIG. 1) by using a feature point set including feature points and a corresponding feature point set including corresponding feature points extracted by the feature point extractor 210. According to an exemplary embodiment, the corresponding position detector 230 may detect the corresponding feature point $P_3$ 330 based on or from the movement position $P_2$ 320 by a feature point tracking method. The tracking of the feature points may be performed using various feature point tracking algorithms, such as a kanade-lucas-tomasi (KLT) tracker algorithm, a taylor expansion, or a hessian matrix.

According to another exemplary embodiment, the corresponding position detector 230 may include at least one of a low-pass filter (LPF) and a high-pass filter (HPF) to determine whether a distortion of the input image is caused by a user of the camera or by an external environment.

According to an exemplary embodiment, since a motion such as a hand shake of the user may probably be distributed in a low-frequency domain, it may be extracted by an LPF. Also, since a motion caused by an external environment such as wind may probably be distributed in a high-frequency domain, it may be extracted by an HPF.

The comparator 250 compares the movement position $P_2$ 320 (see FIG. 3) predicted by the movement position predictor 240 by using a motion sensor and the position of the corresponding feature point $P_3$ 330 (see FIG. 3) determined by the corresponding position detector 230. When the position of the corresponding feature point $P_3$ 330 is within a predetermined range, the comparator 250 determines that the position of the corresponding feature point $P_3$ 330 is accurate, and when the position of the corresponding feature point $P_3$ 330 is out of the predetermined range, the comparator 250 determines that the position of the corresponding feature point $P_3$ 330 is inaccurate.

According to another exemplary embodiment, the comparator 250 may compare the local motion vector S311 with the global motion vector S130 to determine whether a different between the two vectors is within a given range. When the difference is within the given range, the comparator 250 may determine that the position of the corresponding feature point $P_3$ 330 is accurate, and when the difference is out of the given range, the comparator 250 may determine that the position of the corresponding feature point $P_3$ 330 is inaccurate.

The image stabilizer 260 corrects image distortion by using position information about the corresponding feature point $P_3$ 330 (see FIG. 3) based on a result of the comparison performed by the comparator 250. According to an exemplary embodiment, the image stabilizer 260 performs distortion correction by using the rolling shutter effects of a CMOS sensor and the properties of a scan line. This will be described later in detail with reference to FIG. 6.

FIG. 4 illustrates an example of using the IMU sensor 410 as an example of a motion sensor in a camera in which an image stabilizing apparatus is implemented according to an exemplary embodiment.

Figure 5:
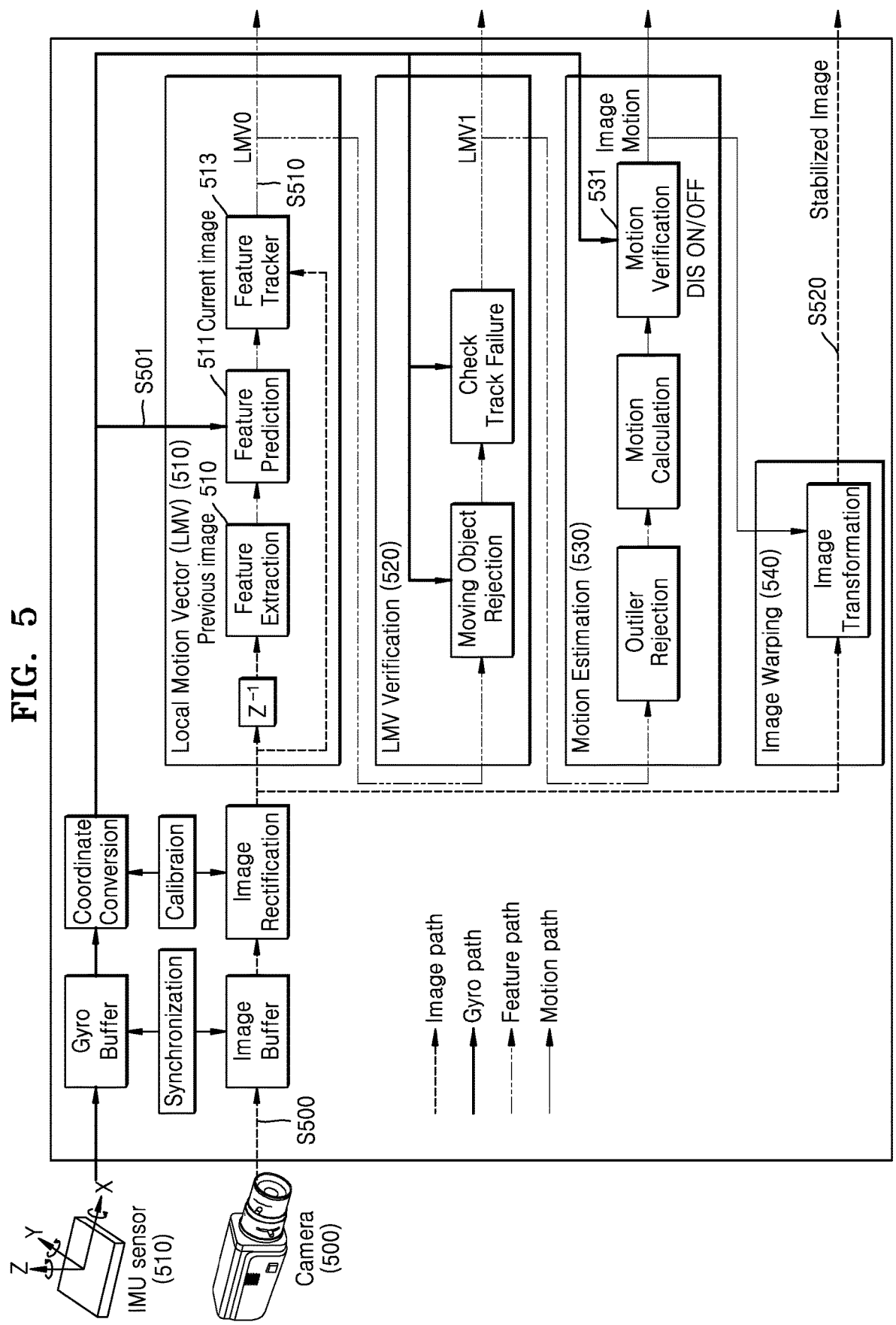
FIG. 5 illustrates an internal configuration of an image processing apparatus in which an image stabilizing apparatus is implemented, according to an exemplary embodiment.

FIG. 5 illustrates an internal configuration of an image processing apparatus 500 in which an image stabilizing apparatus is implemented according to an exemplary embodiment.

Referring to FIG. 5, the image processing apparatus 500 receives an image signal (S500) and then extracts a feature point (510). Thereafter, the image processing apparatus 500 predicts a movement point, to which the extracted feature point is expected to have moved by movement, such as vibration, of the image processing apparatus 500, by using an IMU sensor 510 (511). Through this process, the image processing apparatus 500 calculates a local motion vector by using the predicted movement point (511) and the feature point (510) extracted in the previous image (510).

Also, the image processing apparatus 500 matches the feature point (510) extracted in the previous image and a portion corresponding to a feature point extracted in the current image (513).

In order to determine whether the calculated local motion vector (S510) is accurate, it is determined whether a distance between the position of the movement point (511) predicted on the basis of the physical movement amount of the image processing apparatus 500 measured by the motion sensor and the position of a corresponding feature point (513) extracted in the current image by the image sensor is within a predetermined range (520 and 530).

If the distance is within the predetermined range, the image processing apparatus 500 corrects image distortion by using information about the corresponding feature point (513) extracted by the image sensor and then outputs a stabilized image (S520).

On the other hand, if the distance is out of the predetermined range, the image processing apparatus 500 determines that information about the corresponding feature point (513) extracted in the current image is incorrect or that the feature point is a feature point extracted in a moving object, and does not use the information (S531).

Figure 6:
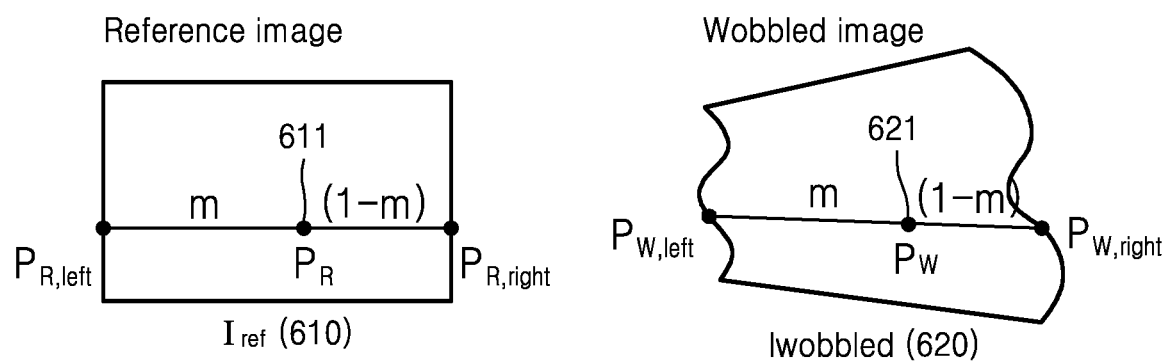
FIG. 6 illustrates properties of a scan line used to correct image vibration in an image stabilizing apparatus, according to an exemplary embodiment.

FIG. 6 illustrates properties of a scan line used to correct image distortion in an image stabilizing apparatus according to an exemplary embodiment.

Referring to FIG. 6, the scan line has a property in which a line $I_{wobbled}$ 620 corresponding to a scan line $I_{ref}$ 610 in a reference image is present in a wobbled input image. Also, the scan line has a property in which a point $P_W$ 621 corresponding to a point $P_R$ 611 in the scan line $I_{ref}$ 610 in the reference image is present in the line $I_{wobbled}$ 620 in the wobbled input image.

Figure 7:
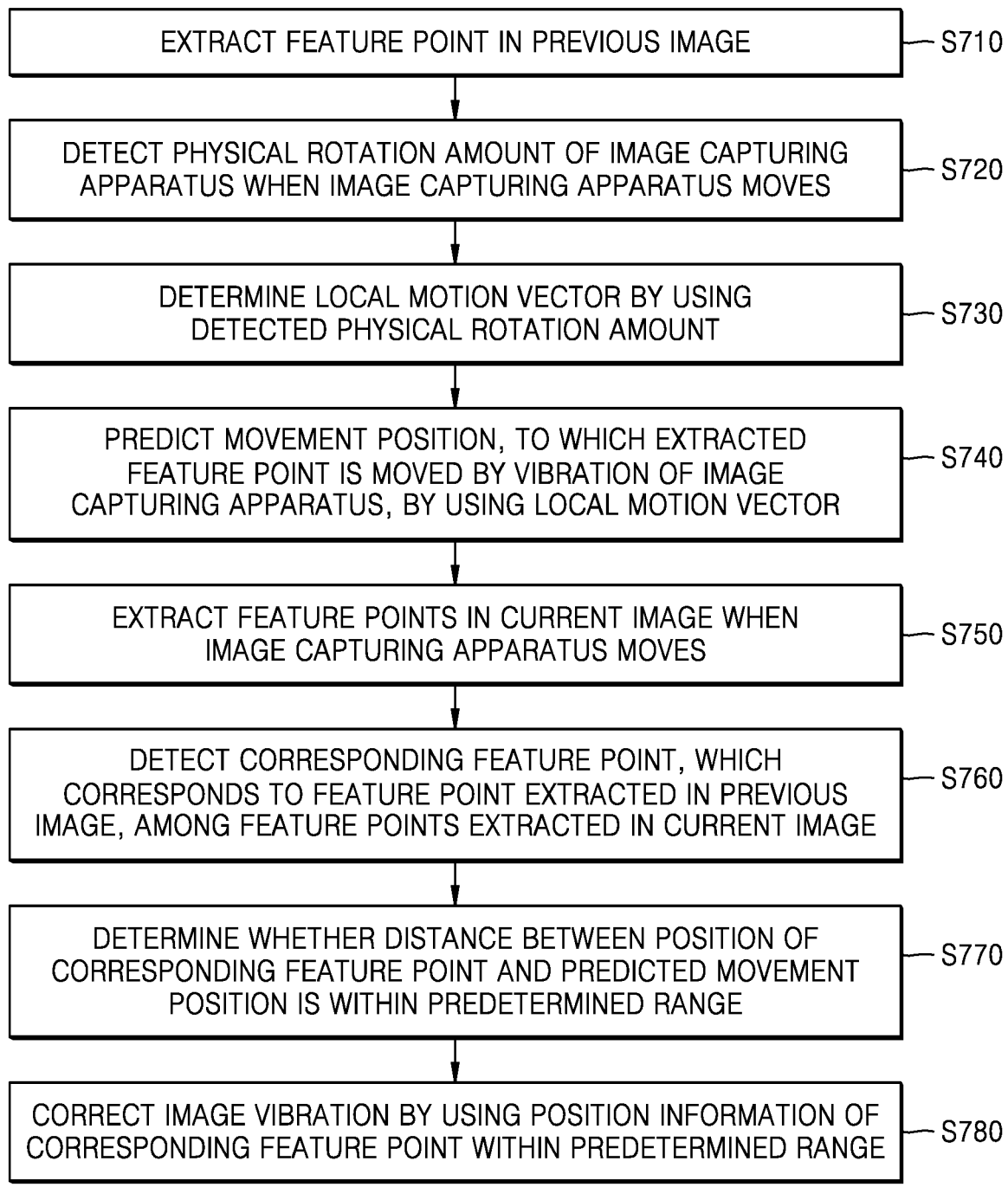
FIG. 7 is a flowchart illustrating a method of performing image stabilization in an image capturing apparatus, according to an exemplary embodiment.

FIG. 7 is a flowchart illustrating a method of performing image stabilization in an image capturing apparatus according to an exemplary embodiment.

Referring to FIG. 7, the image capturing apparatus extracts a feature point in a previous image at a time $t_1$ before the image capturing apparatus is moved (S710). When the image capturing apparatus is moved by a user operation, a hand shake, wind, or external impact, the image capturing apparatus detects a physical movement amount of the image capturing apparatus by using a motion sensor such as an IMU sensor or a gyro sensor (S720) (see 220 in FIG. 2).

The movement position predictor (see 240 in FIG. 2) of the image capturing apparatus uses the detected physical movement amount to calculate a local motion vector representing the movement amount of the image capturing apparatus (S730). Thereafter, the image capturing apparatus uses the local motion vector to predict a movement position to which the extracted feature point is expected to have moved by the movement of the image capturing apparatus (S740).

Also, according to an exemplary embodiment, when the image capturing apparatus is moved, the image capturing apparatus extracts a feature point in the current image at a time $t_2$ by image processing in the corresponding position detector (see 230 in FIG. 2) (S750). The corresponding position detector (see 230 in FIG. 2) detects a corresponding feature point, which corresponds to the feature point extracted in the previous image, among the feature points extracted in the current image (S760). In this process, the corresponding position detector (see 230 in FIG. 2) may calculate a global motion vector by using a set of feature points extracted in the previous image and a set of corresponding feature points extracted in the current image.

The comparator of the image capturing apparatus determines whether the corresponding feature point is valid data, by determining whether a distance between the position of the corresponding feature point and the predicted movement position is within a predetermined range (S770). Thereafter, the image capturing apparatus corrects image distortion by using position information about the corresponding feature point within the predetermined range (S780).

Figure 8:
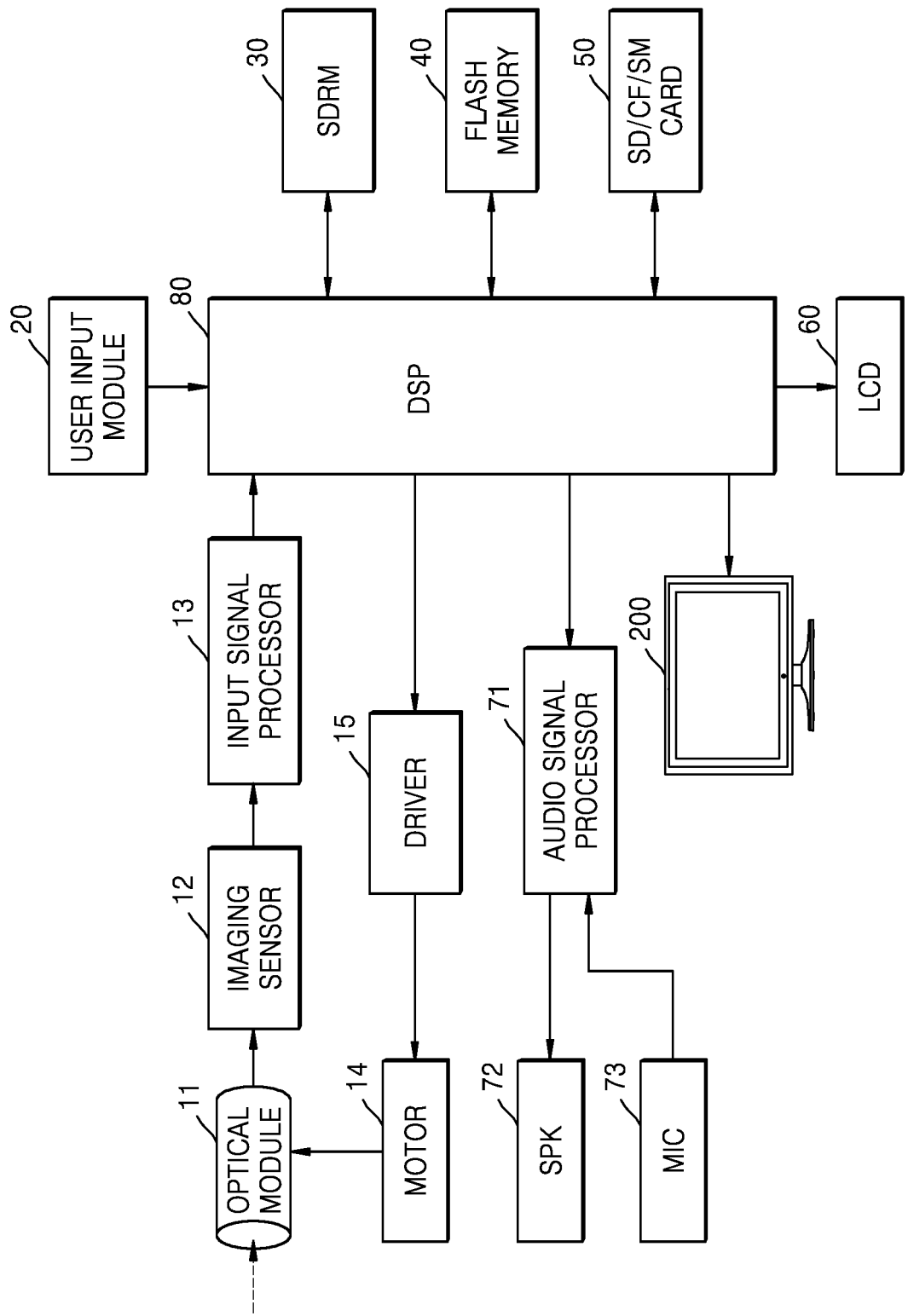
FIG. 8 is a block diagram illustrating a configuration of a digital camera as an example of an image capturing apparatus, according to an exemplary embodiment.

FIG. 8 is a block diagram illustrating a configuration of a digital camera as an example of an image capturing apparatus according to an exemplary embodiment.

Referring to FIG. 8, the digital camera may include an optical module 11 for inputting an optical signal from an object, an imaging sensor 12 for converting the optical signal input through the optical module 11 into an electrical signal, an input signal processor 13 for performing signal processing operations, such as noise reduction and analog-to-digital (A/D) conversion, on the electrical signal provided by the imaging sensor 12, a motor 14 for driving the optical unit 11, and a driver 15 for controlling the operation of the motor 14.

Also, the digital camera may further include a user input (UI) module 20 for inputting a user's operation signal, synchronous dynamic random access memory (SDRAM) 30 for temporarily storing input image data, data for processing operations, and processing results, a flash memory 40 for storing an algorithm needed for the operation of the digital camera, and a Secure Digital (SD)/Compact Flash (CF)/SmartMedia (SM) card 50 as a recording medium for storing image files.

Also, the digital camera may be equipped with a liquid crystal display (LCD) 60 as a display. Also, the digital camera may further include an audio signal processor 71 for converting sound into a digital signal or a digital signal from a sound source into an analog signal, and generating an audio file, a speaker (SPK) 72 for outputting sound, and a microphone (MIC) 73 for inputting sound. Also, the digital camera may further include a digital signal processor (DSP) 80 for controlling the operation of the digital camera.

The configuration and function of each component will now be described in more detail.

The motor 14 may be controlled by the driver 15. The driver 15 may control the operation of the motor 14 in response to a control signal received from the DSP 80.

The imaging sensor 12 may receive an optical signal from the optical module 11 and form an image of the object. The imaging sensor 12 may include a CMOS sensor or a charge-coupled device (CCD) sensor.

The input signal processor 13 may include an A/D converter for converting an electrical signal, which is supplied from the imaging sensor 12 such as a CMOS or a CCD sensor as an analog signal, into a digital signal. Also, the input signal processor 13 may further include a circuit for performing signal processing, such as gain control or waveform shaping, on the electrical signal provided by the imaging sensor 12.

The DSP 80 may perform image signal processing operations on input image data. The image signal processing operations may include gamma correction, color filter array interpolation, color matrix, color correction, color enhancement, estimation of wobbling parameters, and image restoration based on the estimated wobbling parameters. Also, the DSP 80 may compress image data obtained by the image signal processing into an image file or restore the original image data from the image file. Images may be compressed by using a reversible or irreversible algorithm.

The DSP 80 may perform the above-described image signal processing and control each component according to the processing results or in response to a user control signal input through the UI module 20.

As described above, according to the above exemplary embodiments, the image stabilizing apparatus may compensate for image movement such as image translation, in-plane rotation, and vibration caused by external impact and camera movement such as three-axis rotation and translation.

Also, according to the above exemplary embodiments, the image stabilizing apparatus and method thereof may provide stable image signals in various intelligent image surveillance systems that are used in major national facilities, such as military airports, harbors, roads, and bridges, subways, buses, buildings' roofs, stadia, parking lots, cars, mobile devices, and robots.

According to exemplary embodiments, the methods described above in reference to the drawings may be realized as a program code which is executable by a computer, and the program code may be stored in various non-transitory computer readable media and provided to each device so as to be executed by a processor. For example, there may be provided a non-transitory computer readable medium in which a program for providing a different user interaction function to the first area where the transparent display is overlapped with the first body and the second area which is the remaining part of the transparent display is stored in response to the second body being slid from the first body to open the first body. The non-transitory computer readable medium refers to a medium which may store data semi-permanently rather than storing data for a short time such as a register, a cache, and a memory and may be readable by an apparatus. Specifically, the above-described various applications or programs may be stored and provided in a non-transitory recordable medium such as compact disc (CD), digital versatile disk (DVD), hard disk, Blu-ray disk, universal serial bus (USB), memory card, read-only memory (ROM), etc.

At least one of the components, elements or units represented by a block as illustrated in FIG. 2 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The terminology used herein is for the purpose of describing exemplary embodiments only and is not intended to limit the meaning thereof or the scope of the inventive concept defined by the following claims. While one or more exemplary embodiments have been described with reference to the drawings, it will be understood by those of ordinary skill in the art that various changes in form and details may be made therein without departing from the spirit and scope of the inventive concept as defined by the following claims.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image capturing apparatus comprising:
   an image sensor configured to obtain a first image, and obtain a second image after the first image;
   a motion sensor configured to detect movement of the image capturing apparatus; and
   an image stabilizer implemented by at least one processor and configured to:
   determine, in the second image, a movement point of a first feature point extracted in the first image, the movement point being a point to which the first feature point is expected to move in the second image by the movement of the image capturing apparatus,
   detect, in the second image, a second feature point, corresponding to the first feature point, by performing feature point tracking from the movement point of the first feature point, and
   estimate image movement in the second image based on the movement point of the first feature point and the second feature point, and correct image distortion of the second image by compensating for the image movement.

2. The image capturing apparatus of claim 1, wherein the image stabilizer is configured to correct the image distortion based on a determination on whether a distance between the movement point of the first feature point in the second image and the second feature point in the second image is within a predetermined range.

3. The image capturing apparatus of claim 1, further comprising at least one of a low-pass filter to extract a low-frequency domain signal from an image signal of the second image and a high-pass filter to extract a high-frequency domain signal from the image signal of the second image.

4. The image capturing apparatus of claim 1, wherein the image stabilizer is configured to detect the second feature point in the second image by removing a feature point of a moving object.

5. The image capturing apparatus of claim 4, wherein the image stabilizer is configured to remove the feature point of the moving object based on a distance between the movement point of the first feature point in the second image and the second feature point in the second image.

6. The image capturing apparatus of claim 5, wherein the image stabilizer is configured to detect the moving object from a difference image between a reference image, corresponding to the first image, and an image of which image distortion of a previous image, obtained before the first image, is corrected.

7. The image capturing apparatus of claim 6, wherein the image stabilizer is configured to resize the reference image and the previous image, and detect the moving object from a difference image between the resized reference image and the resized previous image.

8. The image capturing apparatus of claim 7, wherein the reference image is obtained before the previous image.

9. The image capturing apparatus of claim 1, wherein the image stabilizer is configured to correct the image distortion of the second image by using a rolling shutter effect in the second image.

10. A method of stabilizing images obtained by an image capturing apparatus, comprising:
    obtaining a first image, and obtaining a second image after the first image;
    detecting movement of the image capturing apparatus which obtains the first image and the second image, by using a motion sensor;
    determining, in the second image, a movement point of a first feature point extracted in the first image, the movement point being a point to which the first feature point is expected to move in the second image by the movement of the image capturing apparatus detected by the motion sensor;
    detecting, in the second image, a second feature point corresponding to the first feature point by feature point tracking from the movement point of the first feature point, and estimating image movement in the second image based on the second feature point; and
    correcting image distortion of the second image by compensating for the image movement.

11. The method of claim 10, wherein the correcting comprises correcting the image distortion based on a determination on whether a distance between the movement point of the first feature point in the second image and the second feature point in the second image is within a predetermined range.

12. The method of claim 10, further comprising filtering by using at least one of a low-pass filter to extract a low-frequency domain signal from an image signal of the second image and a high-pass filter to extract a high-frequency domain signal from the image signal of the second image.

13. The method of claim 10, wherein the detecting the second feature point comprises detecting the second feature point in the second image by removing a feature point of a moving object.

14. The method of claim 13, wherein the removing the feature point of the moving object is performed based on a distance between the movement point of the first feature point in the second image and the second feature point in the second image.

15. The method of claim 14, wherein the moving object is detected from a difference image between a reference image, corresponding to the first image, and an image of which image distortion of a previous image, obtained before the first image, is corrected.

16. The method of claim 15, wherein the moving object is detected by resizing the reference image and the previous image, and detecting the moving object from a difference image between the resized reference image and the resized previous image.

17. The method of claim 16, wherein the reference image is obtained before the previous image.

18. The method of claim 10, wherein the correcting the image distortion comprises correcting the image distortion of the second image by using a rolling shutter effect in the second image.

19. A method of stabilizing images obtained by an image capturing apparatus, comprising:

obtaining a first image, and obtaining a second image after the first image;

detecting movement of the image capturing apparatus which obtains the first image and the second image, by using a motion sensor;

determining, in the second image, a movement point of a first feature point extracted in the first image, the movement point being a point to which the first feature point is expected to move in the second image by the movement of the image capturing apparatus detected by the motion sensor;

detecting a second feature point, corresponding to the first feature point, in the second image by feature point tracking; and estimating image movement based on a distance between the movement point of the feature point and the second feature point, and correcting image distortion of the second image by compensating for the image movement.

20. The method of claim 19, wherein the second feature point in the second image is detected by removing a feature point of a moving object.

* * * * *